Jan. 1, 1924
W. M. CURRAN
HEADLIGHT DIMMER
Filed Feb. 1, 1923
1,479,057
2 Sheets-Sheet 1
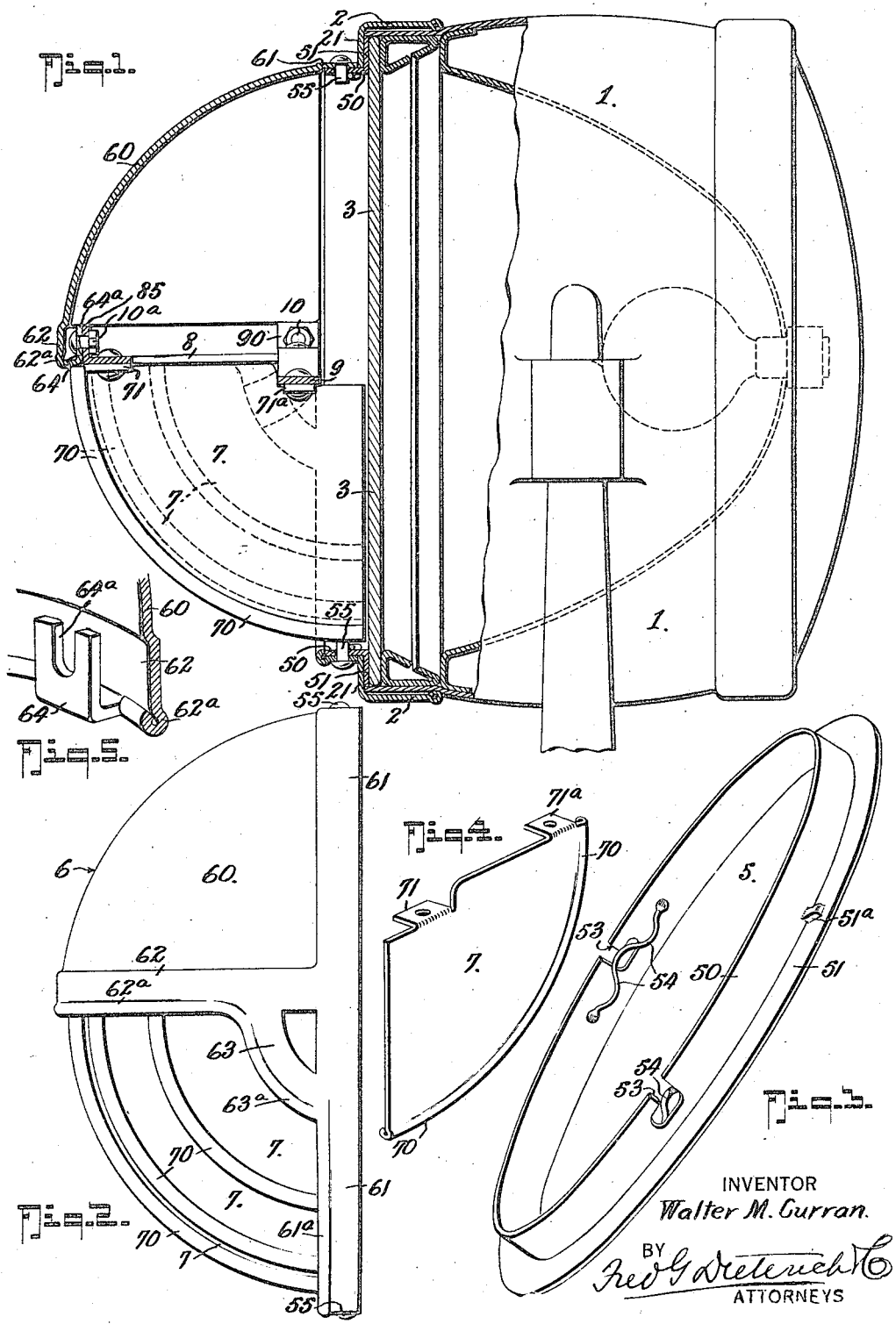
INVENTOR
*Walter M. Curran.*
BY
*Fred G. Dieterich*
ATTORNEYS Jan. 1, 1924. 1,479,057
W. M. CURRAN
HEADLIGHT DIMMER
Filed Feb. 1, 1923  2 Sheets-Sheet 2
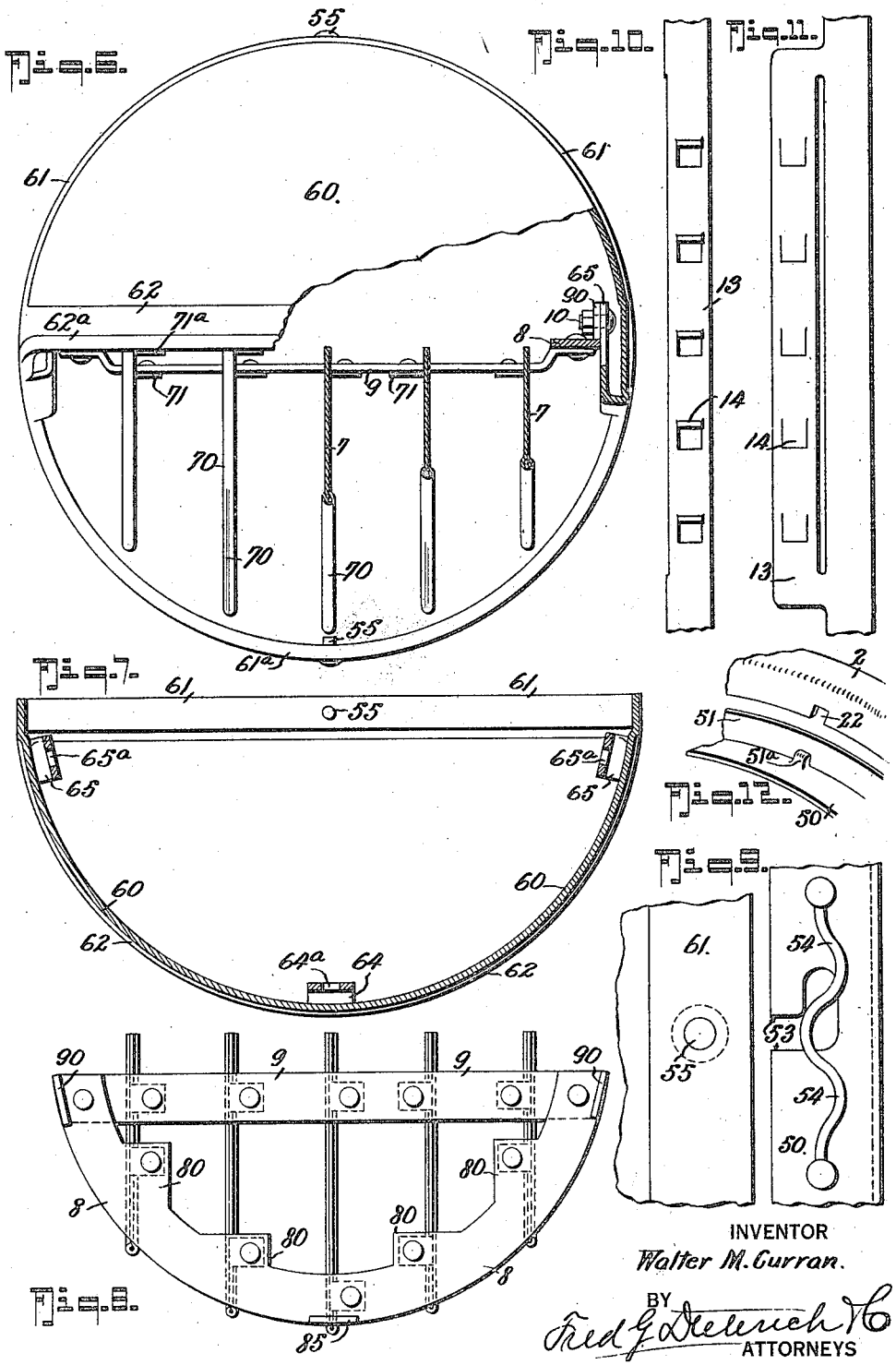
INVENTOR
Walter M. Curran.
BY
Fred J. Dieterich
ATTORNEYS Patented Jan. 1, 1924.

1,479,057

UNITED STATES PATENT OFFICE.

WALTER M. CURRAN, OF PAVILION, MICHIGAN.

HEADLIGHT DIMMER.

Application filed February 1, 1923. Serial No. 616,426.

*To all whom it may concern:*

Be it known that I, WALTER M. CURRAN, a citizen of the United States, residing at Pavilion, in the county of Kalamazoo and State of Michigan, have invented a new and useful Improvement in Headlight Dimmers, of which the following is a specification.

This invention relates to improvements in means attachable to or combined with headlights of automobiles or other vehicles, and it has for its purpose to provide a means of the character stated, adapted for being readily attached to any of the conventional types of automobile headlights and which will operate to eliminate the glare by cutting out the light rays that ordinarily project forwardly into the eyes of the pedestrian or driver of an approaching automobile.

Another object is to provide a glare eliminator for motor vehicle headlights composed of a series of units capable of being readily assembled in such manner that the whole, as a single unit, can be readily slipped onto and held in interlocked engagement with the headlight hood or rim, and in which elements are also included for concentrating the rays of light from the headlight, upon the ground at proper distance in advance of the vehicle, to facilitate safe driving.

Again, my invention seeks to provide an attachment for the conventional types of automobile headlights in which the parts are especially designed for greatly eliminating upward reflection, side glare and direct light ahead and by the use of which the necessity of dimming, in the usual way, is practically done away with, since persons driving a car, with my improved attachments operatively applied thereto, can get a closer observation of the road without the danger experienced when suddenly dimming and reducing the volume of the light from the lamp.

With other objects in view that will be hereinafter apparent, my invention consists of a dimmer or glare eliminator attachment for motor vehicle headlights that embodies the peculiar features of construction and novel arrangement of parts, fully explained in the following detailed description, specifically mentioned in the appended claims and illustrated in the accompanying drawing, in which:—

Figure 1 is a vertical section of my improved attachment, the same being shown applied to the conventional type of drum shaped headlight, a part of the latter being shown in side elevation.

Figure 2 is a side elevation of my improved attachment, the visor frame and glare eliminators being shown assembled as a single unit ready for being attached to the annular rim of the headlight in which is received and held the headlight glass.

Figure 3 is a perspective view of the collar on which the dimmer or glare eliminator members are supported and which fits within and is adapted for being supported by and projected from the headlight rim.

Figure 4 is a perspective view of one of the glare eliminator members hereinafter referred to.

Figure 5 is a detail view of one of the bifurcated brackets on the hood or visor, hereinafter mentioned.

Figure 6 is a front view of several parts of the attachment, including the visor, assembled and ready for being applied to the headlight.

Figure 7 is a horizontal section of the visor or hood portion and illustrates the location of the three slotted stud bolt receiving brackets hereinafter described.

Figure 8 is a plan view of the glare eliminator plates assembled, the several parts being joined as a single unit for being fitted into operative connection with the visor.

Figure 9 is a detail plan view of a portion of the visor and the collar with the spring latch devices that hold the visor secured on the collar member of my improved attachment.

Figures 10 and 11 are detail views of a slightly modified arrangement of the collar hereinafter specifically mentioned.

Figure 12 is a detail view of a portion of the collar and the hood rim and shows a means for holding the collar from turning on the rim.

In the practical development of my invention, the attachment is so designed that when operatively applied onto a headlight, in addition to its being adapted to function as a light dimming means, it shall at the same time, so far as possible, also provide against little or no loss of light or, in other words, while ample provision is made for dimming the entire light from the lamp, provision is also made for conserving, so far as practicable, the full eliminating power of the lamp for the better lighting of the road or street in front of the vehicle.

As before noted, my improved glare eliminator or headlight devices are designed for being readily applied to the conventional types of headlights and since headlights are made in different sizes, my attachment, in practice, is made any size to suit the particular type of headlight to which it is to be applied and hence no statement of the specific dimensions of the parts is deemed necessary further than to mention that it is preferred that the visor or front hood member, hereinafter described in detail, extend forwardly one-half the distance of a complete circle governed by the diameter of the collar that holds the dimmer devices to the headlight, such arrangement being deemed of advantage in order to give the light from the uppermost part of the lamp a chance to reflect against the visor and thereby be downwardly directed.

In the drawings, 1 designates a standard type of drum shaped headlight and 2 the annular rim that is attached to the front edge of the hood in the usual way and which holds the headlight glass or disk in proper operative position, it being understood that my invention does not extend to any improved arrangement or changes in the headlight assembly since my attachments, as will hereinafter be explained, are designed for being readily applied to any of the well known modern headlight structures.

My improved attachment comprises essentially three parts, a peculiarly constructed visor, an assembly of light dimmer plates adapted for being quickly and readily applied to and secured in operative position onto the visor, and a collar with which the visor, with its attached assembly of dimmer plates, is interlockably connected, the collar in turn being practically rigidly secured in place by and projected outwardly from the annular rim 2 of the headlight and it is so formed that when the visor and the glare eliminator devices are disconnected from the said collar, as hereinafter explained access may be had to the headlight glass for cleaning the same, when necessary.

The collar 5, which constitutes one unit of my improved headlight attachment, and which is separately illustrated in Figure 3, includes a ring portion 50 of a diameter only sufficiently less than the diameter of the opening formed by the internal edge 20 of the headlight rim 2 to admit of projecting such portion 50 beyond the said front rim 2, as is clearly shown in Figure 1, by reference to which it will be noticed the collar 5 also includes an annular flange 51 which projects externally of and at right angles to the ring portion 50.

The flange 51 of the collar 5 provides a convenient means for firmly holding the collar in place on the headlight with its ring portion 50 projected forwardly of the headlight glass 3 in position for the convenient attachment and removal therefrom of the visor with the glare dimmer devices applied, it being understood the collar 5 is fitted with its annular flange 51 engaging the inner side of the annular flange 21 of the usual annular rim 2 before the latter is fitted onto the front of the headlight hood as will be readily understood from Figure 1 of the drawings, and to provide for holding the collar against rotation within the rim 2 the collar flange 51 has a lug 51ᵃ adapted for engaging a notch 22 in the collar rim 5, as is shown in Figure 12 of the drawings.

As is clearly shown in Figures 3 and 9 of the drawing, the flange 51 of the collar 5 has oppositely disposed bayonet slots 53 and a spring latch 54 cooperative with each slot and the said slots and latches provide for quickly locking the rim 61 of the visor onto the collar 5 when fitting the visor in place, the latter having diametrically oppositely disposed studs 55 for engaging the slots 53 (see Figure 9).

The parts that constitute the attachment are of sheet metal and the visor 6 includes a hood portion 60 that extends downwardly from an inner ring member 61, and whose lower edge 62, as also the part 61, are slightly raised to give the external appearance of the visor hood a countersunk effect, and to further add rigidity to the visor structure, the front edge of the lower portion of the ring member 61 and the base of the edge 62 are beaded as at 61ᵃ—62ᵃ, and the latter beaded portion 62ᵃ merges with the beaded edge 63ᵃ of a downwardly extended segment 63, that adds strength and ornamentation to the visor, as is best indicated in Figure 2 of the drawings.

Midway its lower edge 62, the visor has an inwardly and upwardly bent hook-like bracket 64, whose upper end has an open slot 64ᵃ and at diametrically opposite sides of the inner end of the lower edge thereof, the visor hood has similar bent up brackets 65 with slots 65ᵃ, as is shown in Figures 1, 6 and 7; the purpose of the several brackets 64 and 65 being presently explained.

In Figure 8, is shown an assembly of glare eliminators constructed in accordance with my invention and which, as a unit, are fitted into and supported by the visor frame. The glare eliminator devices comprise a series of segment shaped plates 7, each stamped out of sheet metal with the lower or exposed edges rolled to a beaded shape, as at 70, for strength and appearance, and at the upper edge each plate has a pair of apertured extensions that are bent back at right angles to the body of the plate to form outer ears 71—71ᵃ for the convenient attaching of the several plates 7 (of progressively decreasing size from the center to the opposite sides) to a hanger frame composed of a substantially semi-circular horizontal member 8 provided along its inner edge with stepped extensions 80 for connection thereto of the outer ears 71 of the plates 7.

By again referring to the said Figure 8, it will be noticed the inner ends of the members 8 are riveted or otherwise secured to the upper side of a cross member 9, and the said inner ends are bent up at right angles to constitute brackets 90 that position adjacent the opposite slotted end brackets 65, the said brackets 90 being apertured for the passage of the clamp or screw studs 10 that attach to the brackets 90 and fit into the slots 65ª of the brackets 65, the said studs constituting the inner supports for the plates assembly whose forward end is supported by an apertured bracket 85 which cooperates with the slotted bracket 64 to provide for readily applying the stud or clamping bolt 10ª, as is clearly indicated in Figure 1.

By arranging the clamping bolts which sustain the eliminator plates 7 and their supporting elements on the inner side of the visor frame, as described and shown, screw heads or the like on the outside of the visor are avoided, leaving the entire outside surface of the said visor free for the desired finishing, it being understood that the glare eliminator plates 7 and their supporting elements are fitted with the parts arranged as a unit (see Figure 8) and secured within the visor frame before the latter is fitted onto the headlight hood.

To provide for quickly applying and interlocking the visor frame with its attached glare eliminator element onto or detaching the same from the collar 5, the means so far described for holding the glare eliminator plates within the visor frame are ordinarily sufficient to maintain the said eliminator elements in such rigid relation as to prevent rattling of the parts.

When the character of the headlight is such that it requres an attachment constructed in accordance with my invention, of a large size, a supplemental means for bracing the lower ends of the plates 7 is used and such means may be provided by forming the front edge of the lower portion of the visor frame with a bendable extension 13, as shown in Figure 11, that is formed with cut portions shaped for being bent up to constitute ears 14 adapted for being secured to the lower ends of the plates 7.

As is clearly shown in Figures 1 and 6 the several lateral glare eliminating plates 7 are all arranged to fit across the lower half of the headlight and are of such shape and of sufficient length to remove the glare, at a very short angle.

The construction of the visor frame is such that it extends low enough to throw the light rays to the road close to the car, where most needed, and to allow the light rays to focus straight ahead.

The means for attaching the glare eliminator to the visor frame being located wholly within the visor, does away with need of drilling bolt holes when applying the attachment and it further provides for applying the said attachment without defacing the equipment already installed.

The visor with the glare eliminator devices can be removed in a moment when access to the headlight glass is desired.

The attachment also acts as a protection to headlight glass and does away entirely with the use of "dash control" when meeting other vehicles.

What I claim is:

1. A glare eliminator for vehicle head lights comprising a visor ring, a visor carried by said ring, a horizontal cross frame supported beneath the visor, an assembly of vertically disposed glare eliminator plates secured to said horizontal frame and sustained thereby, and means for securing the visor ring to the head light rim to hold the assembly of eliminator plates over the lower exposed half of the head light lens.

2. A glare plate guide for attachment to headlight visors comprising a horizontal open frame adapted to be secured to the underside of a visor and an assembly of vertically disposed glare eliminator plates secured to said frame substantially as shown and described.

3. A glare eliminator for automobile headlights comprising an assembly of vertically parallelly disposed plates adapted for eliminating the side glare rays of the headlight, a visor frame, means for suspending the plates on the visor frame to project over the lower exposed half of the headlight lens, the said means comprising inwardly and upwardly bent slotted brackets on the inside of the lower rim edge of the visor frame, apertured brackets on the plates assembly for coengaging the said several slotted brackets, and bolt and nut connections that join the slotted brackets and the apertured brackets and which constitute supports for the glare plates assembly.

4. A glare eliminator attachment for automobile headlights comprising a collar including an annular rim and an angled annular flange, the latter adapted for being clamped within the headlight rim when the latter is fitted in place on the headlight hood and to project the annular rim forwardly from the hood rim, a visor frame which includes an annular ring at the inner edge for slipping over the projected collar rim, means for interlockably connecting said collar rim and the visor ring and an assembly of glare eliminator plates disposed in vertical relation, and further means for pendently supporting the said assembly of plates on the visor frame to project over the lower exposed half of the headlight lens.

5. In a glare eliminator attachment for automobile headlights, the combination with a visor attachable to the front of the headlight hood; of an assembly of glare eliminator plates disposed in vertical parallel relation, and means for removably sustaining the said assembly of plates pendent from the visor, the sustaining connections being located entirely within the lower end of the said visor.

6. In a glare eliminator attachment for automobile headlights, the combination with a visor attachable to the front of the headlight hood; of an assembly of glare eliminator plates disposed in vertical parallel relation, means for removably sustaining the said assembly of plates pendent from the visor, the sustaining connections being located entirely within the lower end of the said visor, a collar adapted for being secured by and projected forwardly from a headlight hub rim, and key slot spring latch and pin connections for interlockably connecting the visor with the collar.

7. A glare eliminator for automobile headlights comprising an assembly of vertically disposed parallel plates of progressively decreasing size from the center toward the opposite side, each plate having integrally apertured horizontal ears at the upper edge, a curved horizontal member to which the outer ears on the eliminator plates fasten, a cross member secured onto and connecting the opposite inner ends of the curved member, a visor projected from the headlight hood, and means for supporting the assembly of eliminator plates pendent from the visor to project over the exposed portion of the headlight lens.

8. A glare eliminator for automobile headlights comprising an assembly of vertically disposed parallel plates of progressively decreasing size from the center toward the opposite side, each plate having integrally apertured horizontal ears at the upper edge, a curved horizontal member to which the outer ears on the eliminator plates fasten, a cross member secured onto and connecting the opposite inner ends of the curved member, a visor projecting from the headlight hood, means for supporting the assembly of eliminator plates pendent from the visor to project over the exposed portion of the headlight lens, the visor including a lower half circle rim having a bent portion provided with angled members adapted for being secured to and to brace the lower ends of the glare eliminator plates against lateral movement.

WALTER M. CURRAN.